(12) United States Patent
Nakaya

(10) Patent No.: US 11,042,242 B2
(45) Date of Patent: Jun. 22, 2021

(54) TOUCH PANEL DEVICE AND METHOD FOR CALCULATING TOUCH POSITION COORDINATE OF TOUCH PANEL

(71) Applicant: LG DISPLAY CO., LTD., Seoul (KR)

(72) Inventor: Hideo Nakaya, Tokoyo (JP)

(73) Assignee: LG DISPLAY CO., LTD., Seoul (KR)

(*) Notice: Subject to any disclaimer, the term of this patent is extended or adjusted under 35 U.S.C. 154(b) by 101 days.

(21) Appl. No.: 14/865,607

(22) Filed: Sep. 25, 2015

(65) Prior Publication Data

US 2016/0092023 A1 Mar. 31, 2016

(30) Foreign Application Priority Data

Sep. 30, 2014 (JP) .............................. JP2014-200039

(51) Int. Cl.
*G06F 3/041* (2006.01)

(52) U.S. Cl.
CPC ................................. *G06F 3/0418* (2013.01)

(58) Field of Classification Search
None
See application file for complete search history.

(56) References Cited

U.S. PATENT DOCUMENTS

| | | | | |
|---|---|---|---|---|
| 5,668,352 A * | 9/1997 | Christian | ................. | G06F 3/038 178/18.02 |
| 2002/0070926 A1* | 6/2002 | Kavanagh | ............. | G06F 3/0418 345/173 |
| 2004/0164970 A1* | 8/2004 | Benard | ................. | G06F 3/0436 345/177 |
| 2009/0085887 A1* | 4/2009 | Chueh | ................... | G06F 3/0488 345/173 |
| 2009/0167725 A1* | 7/2009 | Lee | ........................ | G06F 3/0418 345/178 |
| 2011/0310038 A1* | 12/2011 | Park | ...................... | G06F 3/0418 345/173 |
| 2012/0280945 A1* | 11/2012 | Shih | ....................... | G06F 3/0418 345/178 |
| 2012/0280946 A1* | 11/2012 | Shih | ........................ | G06F 3/045 345/178 |
| 2013/0057493 A1* | 3/2013 | Hwang | ................. | G06F 3/0418 345/173 |
| 2013/0082950 A1* | 4/2013 | Lim | ...................... | G06F 3/0418 345/173 |
| 2013/0234975 A1* | 9/2013 | Lin | ........................ | G06F 3/044 345/174 |

(Continued)

FOREIGN PATENT DOCUMENTS

WO 2014-119347 A1 8/2014

*Primary Examiner* — Benjamin X Casarez
(74) *Attorney, Agent, or Firm* — Dentons US LLP

(57) ABSTRACT

A touch panel device having a plurality of touch sensors for detecting a touch position includes a coordinate calculation unit that calculates a touch coordinate from an output value of at least one of the plurality of touch sensors; and a coordinate correction unit that receives a calculated touch coordinate from the coordinate calculation unit, includes a lookup table that stores a correspondence relationship between a plurality of real touch position coordinates and a plurality of calculated touch coordinates, and extracts one of the plurality of real touch position coordinates as a corrected touch coordinate that corresponds to the calculated touch coordinate.

7 Claims, 9 Drawing Sheets

(56) References Cited

U.S. PATENT DOCUMENTS

| | | | | |
|---|---|---|---|---|
| 2013/0342468 A1* | 12/2013 | Hekstra | ............... | G06F 3/0418 |
| | | | | 345/173 |
| 2014/0002409 A1* | 1/2014 | Rohozin | ............... | G06F 3/0488 |
| | | | | 345/174 |
| 2014/0002418 A1* | 1/2014 | Backes | ............... | G06F 3/0354 |
| | | | | 345/174 |
| 2014/0118282 A1* | 5/2014 | Wen | ............... | G06F 3/0418 |
| | | | | 345/173 |
| 2014/0184561 A1* | 7/2014 | Kim | ............... | G06F 3/044 |
| | | | | 345/174 |
| 2014/0253482 A1* | 9/2014 | Toyoura | ............... | G06F 3/0418 |
| | | | | 345/173 |
| 2015/0091859 A1* | 4/2015 | Rosenberg | ............... | G06F 3/03545 |
| | | | | 345/174 |
| 2015/0162932 A1* | 6/2015 | Page | ............... | G01R 27/2605 |
| | | | | 324/658 |
| 2015/0169123 A1* | 6/2015 | Lee | ............... | G06F 3/0418 |
| | | | | 345/174 |
| 2015/0220210 A1* | 8/2015 | Sturdevant | ............... | G06F 3/044 |
| | | | | 345/178 |
| 2015/0234527 A1* | 8/2015 | Roberts | ............... | G06F 3/0416 |
| | | | | 345/174 |
| 2015/0261358 A1* | 9/2015 | Liu | ............... | G06F 3/0418 |
| | | | | 345/174 |
| 2015/0309659 A1* | 10/2015 | Liu | ............... | G06F 3/044 |
| | | | | 345/174 |
| 2015/0363043 A1* | 12/2015 | Mikami | ............... | G06F 3/044 |
| | | | | 345/174 |
| 2016/0259479 A1* | 9/2016 | Kang | ............... | G06F 11/00 |

* cited by examiner (b) lookup table (LUT)
| address | X value | Y value |
|---|---|---|
| Xc1, Yc1 | X1 | Y1 |
| Xc2, Yc2 | (X2+X3+X4)/3 | (Y2+Y3+Y4)/3 |
| Xc3, Yc3 | X5 | Y5 |
| : | : | : |
| : | : | : |
FIG. 2B
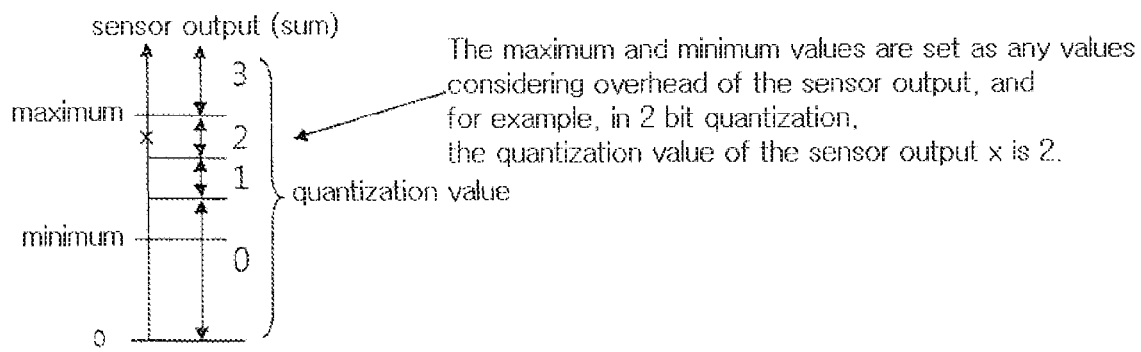
FIG. 3
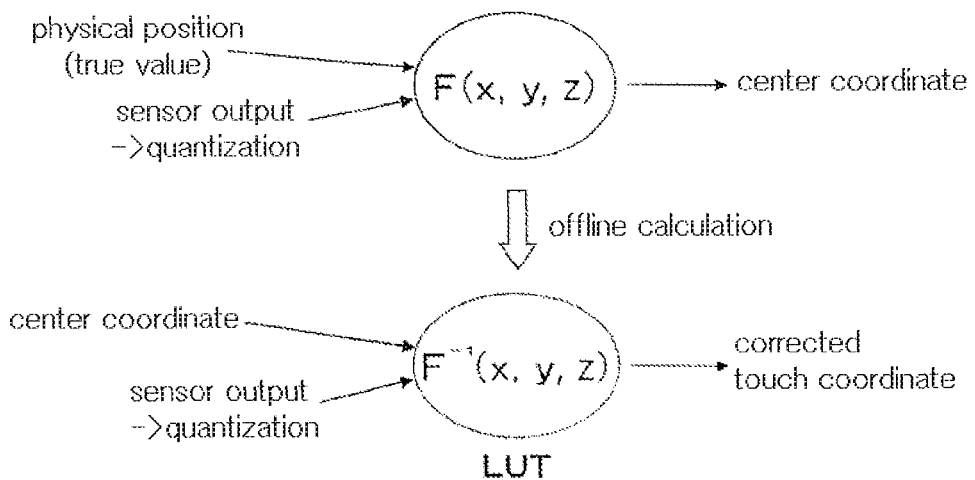
FIG. 4

TOUCH PANEL DEVICE AND METHOD FOR CALCULATING TOUCH POSITION COORDINATE OF TOUCH PANEL

CROSS-REFERENCE TO RELATED APPLICATIONS

The present application claims the benefit of Japanese Patent Application No. 2014-200039 filed in Japan on Sep. 30, 2014, which is incorporated by reference in its entirety for all purposes as if fully set forth herein.

BACKGROUND OF THE INVENTION

Field of the Invention

The present disclosure relates to a touch panel device with improved precision of detecting a touch and a method for calculating a touch position coordinate of the touch panel.

Discussion of the Related Art

FIG. 7 is a flow chart for explaining a method for calculating a touch position coordinate in a touch panel device according to the related art. FIG. 8 is a block diagram of a touch panel device according to the related art.

The touch panel device according to the related art includes a touch panel 10, a touch control IC 20, an MCU (micro controller unit) 30, and a host controller 40.

In the touch panel 10, although not shown in the figures, touch sensors are formed with multiple arrangements perpendicularly and horizontally to detect a touch position. The touch panel 10 receives a control command from the touch control IC 20 and outputs Raw data of each touch sensor as an analog signal (step S701).

The touch control IC 20 controls a sensing method of the touch panel 10 and also converts the analog Raw data received from the touch panel 10 into a digital signal and outputs the digital Raw data.

The MCU 30 includes a noise filter 31, a differential data generation unit 32, a coordinate calculation unit 33 and a coordinate ID setting unit 34. The noise level of the digital Raw data converted by the touch control IC 20 is reduced and/or removed by the noise filter 31. The differential data generation unit 32 generates differential data based on the noise-filtered Raw data (step S702). Next, the coordinate calculation unit 33 determines whether or not there is a touch and calculates a coordinate of the touch position using the differential data (step S703). Moreover, the coordinate ID setting unit 34 assigns an ID to the coordinate data (step S704) and outputs a signal of the coordinate data to the host controller 40 (step S705).

Japanese Patent Publication No. 2011-48663 (hereinafter, the "Patent document") discloses a method for calculating a touch position coordinate at an edge portion of a touch panel according to the related art. FIGS. 9A to 9D are views for explaining a method for calculating a touch position coordinate in a touch panel device according to the Patent document. In FIGS. 9A to 9D, X1, X2, X3, X4 and X5 are X-direction touch sensors, and Y1, Y2, Y3, Y4 and Y5 are Y-direction touch sensors. The method disclosed in the Patent document may have a problem of precisely calculating a touch position, when a touch area by a touch pen or finger extends over a plurality of touch sensors (that is, the touch area is larger than a detection range of the touch sensor).

FIG. 9A illustrates a case where an output of the touch sensor X2 is a peak position with respect to a differential value of each touch sensor X1, X2, X3, X4 and X5 of the X-direction.

FIG. 9B illustrates a case where an output of the touch sensor X1 is a peak position with respect to a differential value of each touch sensor X1, X2, X3, X4 and X5 of the X-direction and a portion of a touch area deviates from a detection range of the touch sensor X1.

FIG. 9C illustrates a case where there is no deviation of a touch area in the Y-direction and there is a deviation of a touch area in the X-direction.

FIG. 9D is a view where a portion of overlapping a detection range of the touch sensor in each of the X-direction and the Y-direction with respect to the touch area of FIG. 9C is identified as an "overlap width."

In the Patent document, the touch area extends over a plurality of touch sensors, and the touch device decides whether or not the output peak position of the touch sensor is located on an edge of the touch panel. In addition, when the output peak position of the touch sensor is determined to be located on an edge of the panel, it is assumed that the touch area is a circle (or an ellipse), and a central position of the touch area is calculated from the overlap widths of the X-direction and the Y-direction.

Namely, as shown in FIG. 9A, the coordinate calculation at an ordinary position is performed by calculating a center position from comparison of an output differential value of the touch sensor and a threshold value, to thereby calculate the touch position. Moreover, as shown in FIG. 9B, the center position is simply obtained as the touch position with respect to an edge portion, and a high precision of the position detection is sought by considering the 'overlap width' as shown in FIG. 9D and then obtaining the center position.

The calculation of the center position is performed using the following Equation (1).

$$\left.\begin{array}{l} Dsum = \sum_{i=1}^{n} Di \\ Xsum = \sum_{i=1}^{n} Di \times Xi \\ Ysum = \sum_{i=1}^{n} Di \times Yi \end{array}\right\} \Rightarrow \begin{array}{l} Xcenter = Xsum/Dsum \\ Ycenter = Ysum/Dsum \end{array} \quad \text{Equation (1)}$$

$Di$: output value of each sensor $Xi$: X coordinate of the center of each sensor $Yi$: Y coordinate of the center of each sensor However, this method may have a problem of precisely calculating a touch position. In the Patent document, the detection width of one touch sensor is designed to be smaller than the width of the touch area by the touch pen. As a result, when the width of the touch area by the touch pen is smaller than the detection width of one touch sensor, the technique disclosed in the Patent document may not be appropriate.

In addition, if the touch coordinate is obtained by calculating the center position while moving the relative positional relationship between the touch pen and the touch sensor constantly in the horizontal and perpendicular directions, there may be a discrepancy between the real position and the calculated center position due to, for example, non-uniform sensitivity of each touch sensor or irregular arrangements.

Moreover, when the width of the touch area by the touch pen is smaller than the detection width of one touch sensor, there may be an additional problem, which will now be described.

FIG. 10 illustrates a case where a width of the touch area by the touch pen is smaller than a detection width of one touch sensor. More specifically, FIG. 10 illustrates a case where the width of the touch area by the touch pen is 4.0 mm (that is, the touch area is a circle with a diameter of 4.0 mm) and the detection width of the touch sensor is 6.4 mm. FIGS. 11A to 11C are views for explaining a problem when the touch position detection is performed based on the center position using the touch pen and touch sensor of FIG. 10. More specifically, FIGS. 11A to 11C are diagrams of cases 1, 2 and 3, respectively.

FIG. 11A is a view illustrating a calculation result of the center position when the touch area by the touch pen is disposed within the detection width of one touch sensor in the X-direction and the Y-direction according to case 1.

FIG. 11B is a view illustrating a calculation result of the center position when the touch area by the touch pen extends over and overlaps the detection width of two touch sensors in the X-direction and is disposed within the detection width of one touch sensor in the Y-direction according to case 2.

FIG. 11C is a view illustrating a calculation result of the center position when the touch area by the touch pen extends over and overlaps the detection width of two touch sensors in each of the X-direction and the Y-direction according to case 3.

In FIG. 11A according to case 1, a position that does not overlap two touch sensors is touched, and the center position of each of the X-direction and the Y-direction is calculated based on an output of one touch sensor. In this case, a central position of the touch sensor is obtained as the center position with respect to each of the X-direction and the Y-direction, which may lower precision.

In FIG. 11B according to case 2, a central position of the touch sensor is obtained as the center position with respect to the Y-direction, and the center position is obtained based on outputs of two touch sensors with respect to the X-direction. As a result, since the position is obtained according to an overlap between the touch area and each of two touch sensors with respect to the X-direction, precision of the position detection in the X-direction can be improved as compared with the Y-direction.

In FIG. 11C according to case 3, since a center position can be calculated based on outputs of two touch sensors in each of the X-direction and the Y-direction, the position other than the central position of each touch sensor can be obtained as the center position in both directions. As a result, denseness at a position interval for detection may be generated depending on the touch position.

In addition, when a deviation of the touch area is generated at an edge portion of the touch panel, the touch area does not extend over another touch sensor, and a central position of the outermost touch sensor can be detected as the center position, thereby increasing errors.

SUMMARY OF THE INVENTION

Accordingly, the present invention is directed to a touch panel device and a method for calculating a touch position coordinate of the touch panel that substantially obviate one or more of the problems due to limitations and disadvantages of the related art.

An advantage of the present invention is to provide a touch panel device with improved precision of detecting a touch position even when a width of a touch area is smaller than a detection width of one touch sensor.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a touch panel device including a plurality of touch sensors for detecting a touch position may, for example, include a coordinate calculation unit that calculates a touch coordinate from an output value of at least one of the plurality of touch sensors; and a coordinate correction unit that receives a calculated touch coordinate from the coordinate calculation unit, includes a lookup table that stores a correspondence relationship between a plurality of real touch position coordinates and a plurality of calculated touch coordinates, and extracts one of the plurality of real touch position coordinates as a corrected touch coordinate that corresponds to the calculated touch coordinate.

In another aspect, a method for calculating a touch position coordinate of a touch panel including a plurality of touch sensors for detecting a touch position may, for example, include a first step of calculating a touch coordinate by a center calculation from output values of the plurality of touch sensors; a second step of obtaining a correspondence relationship between a real touch position of the touch panel and the touch coordinate calculated by the first step with respect to a substantially entire surface of the touch panel when the touch panel is touched and a width of a touch area is smaller than a detection width of one touch sensor; a third step of: setting a center position of two or more real touch positions and a repeated touch coordinate as one-to-one conversion data when the repeated touch coordinate is calculated with respect to the two or more real touch positions; setting one real touch position and one touch coordinate as one-to-one conversion data when the one touch coordinate which does not overlap a touch coordinate of another touch position is calculated with respect to the one real touch position; and creating a lookup table for extracting one touch position from the touch coordinate calculated by the first step based on the conversion data and storing the lookup table in a memory unit; and a fourth step of extracting a touch position corresponding to the touch coordinate calculated by the first step from the lookup table stored in the memory unit when the touch panel is really touched and outputting the touch position as a corrected touch coordinate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

FIGS. 2A and 2B are views for explaining a method of creating an LUT according to an embodiment of the present invention;

FIG. 3 is a view for explaining quantization of a sensor output according to an embodiment of the present invention;

FIG. 4 is a view for explaining a method for correcting a touch coordinate using a plurality of LUTs according to an embodiment of the present invention;

DETAILED DESCRIPTION OF THE ILLUSTRATED EMBODIMENTS

Reference will now be made in detail to exemplary embodiments of the present invention, examples of which are illustrated in the accompanying drawings.

Embodiment 1

In a touch panel, a touch area is detected from an output of a touch sensor corresponding to a touch point, and a touch coordinate is calculated by computing a center position from the output value of each touch sensor. However, when a width of the touch area is smaller than a detection width of one touch sensor, precision or a degree of agreement between a calculated center coordinate and a real touch position coordinate may become worse depending on a touch position.

According to an embodiment of the present invention, a corresponding relationship between real touch position coordinates and calculated center position coordinates is obtained in advance through simulations or experiments and recorded in a correspondence table, and a conversion table (e.g., lookup table: LUT), which may be implemented into a hardware, is created using the correspondence table to read real position coordinates from calculated center position coordinates.

In operation, a center position coordinate calculated from a sensor output of the touch panel is inputted into the LUT, and a real position coordinate is read from the LUT, whereby a touch coordinate can be calculated with high speed and high precision.

Figure 1:
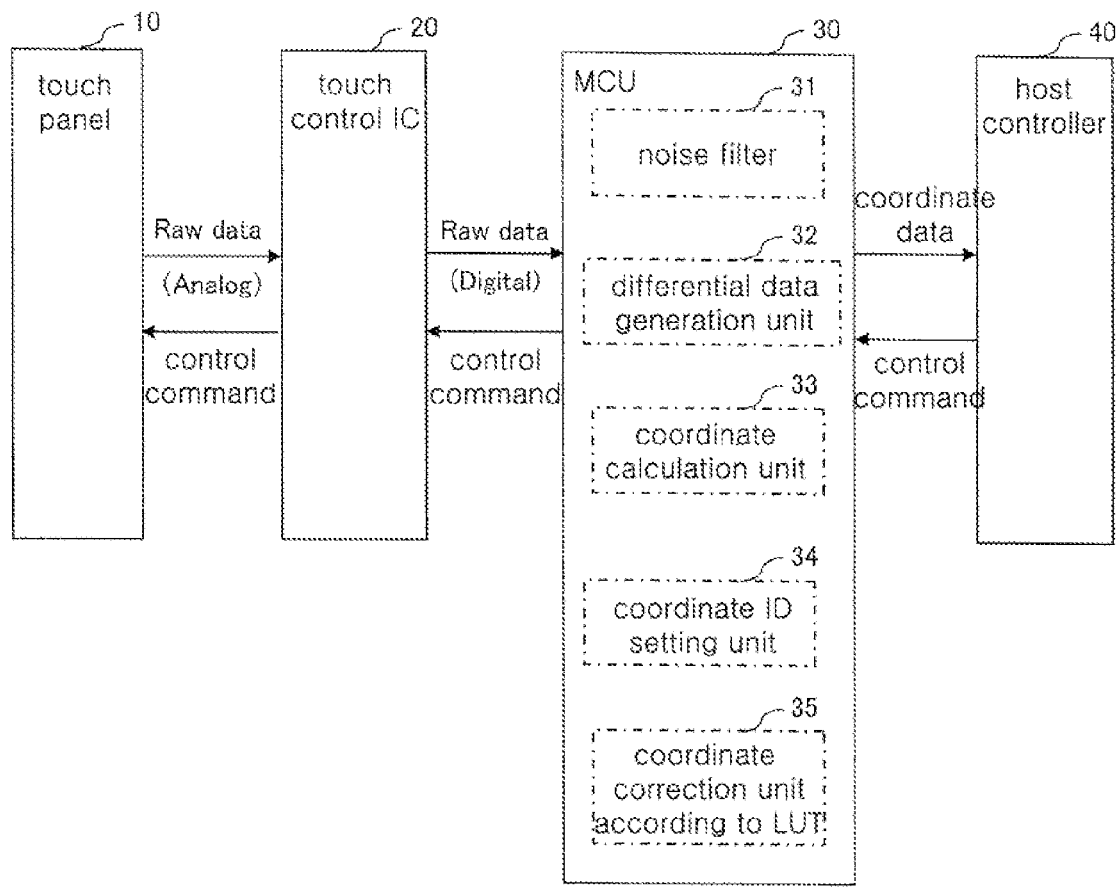
FIG. 1 is a block diagram of a touch panel device according to an embodiment of the present invention.

FIG. 1 is a block diagram of a touch panel device according to Embodiment 1 of the present invention.

Figure 8:
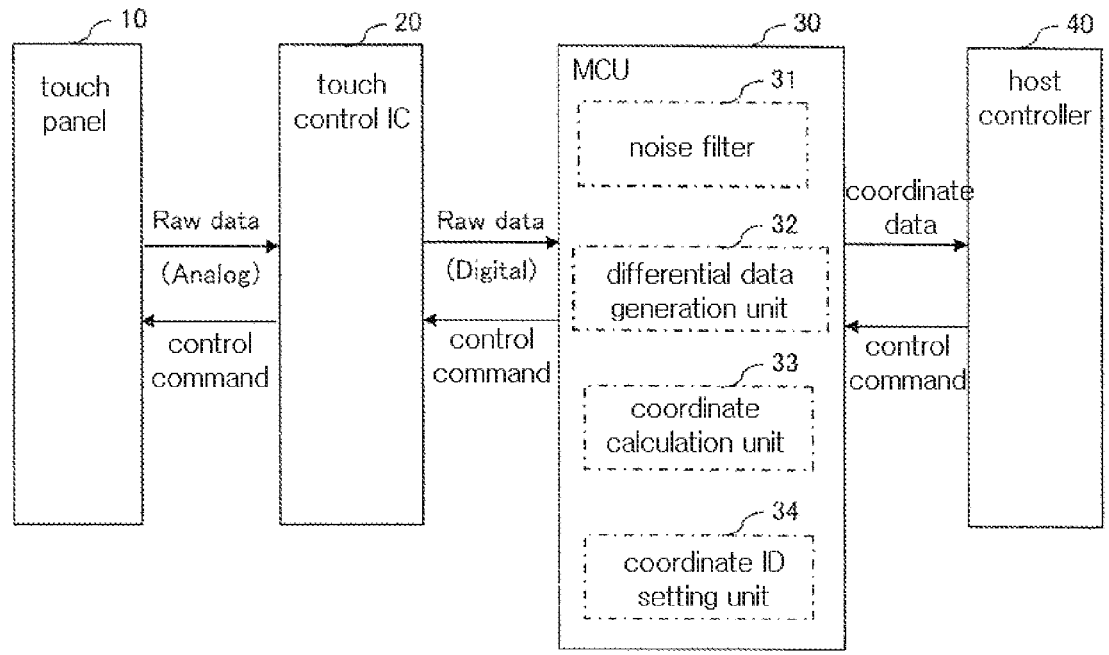
FIG. 8 is a block diagram of a touch panel device according to the related art.
Figure 9A:
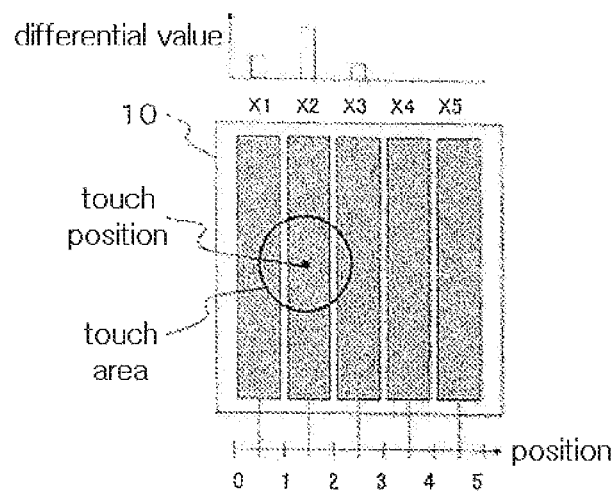
FIGS. 9A to 9D are views for explaining a method for calculating a touch position coordinate in a touch panel device according to the related art.
Figure 9B:
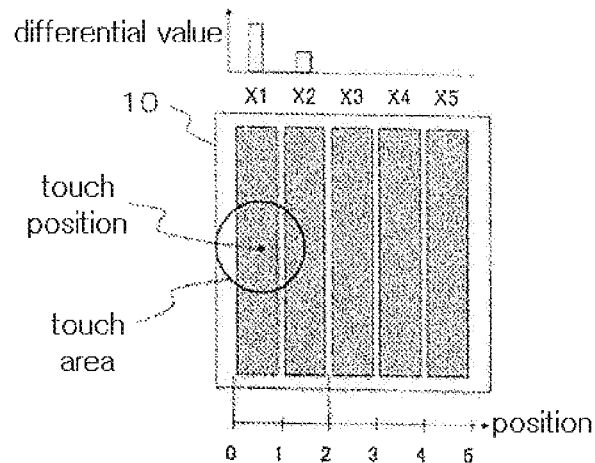
Figure 9C:
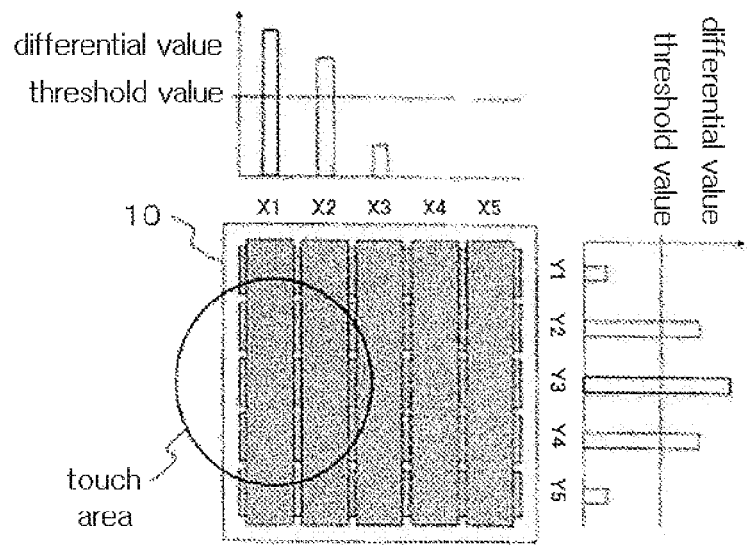
Figure 9D:
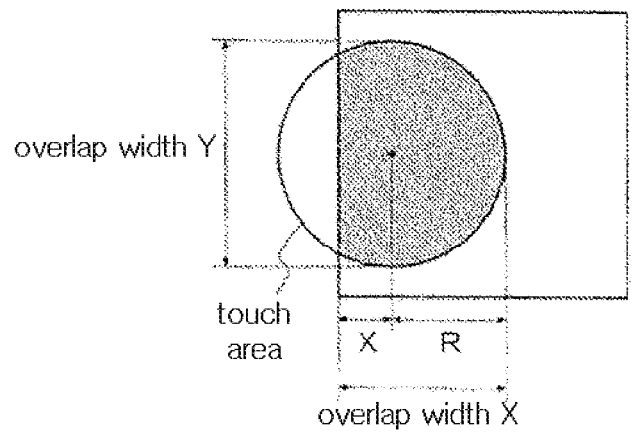

The touch panel device includes a touch panel 10, a touch control IC 20, an MCU (micro controller unit) 30, and a host controller 40. As compared with the touch panel device according to the related art shown in FIG. 8, the touch panel device according to Embodiment 1 of the present invention further includes a coordinate correction unit 35 according to an LUT in the MCU 30, in addition to a noise filter 31, a differential data generation unit 32, a coordinate calculation unit 33 and a coordinate ID setting unit 34. A detailed method to implement the configuration and concept will now be described.

A touch coordinate is calculated according to a center computation while a touch pen moves with respect to the touch panel 10 in which a plurality of touch sensors are arranged in each of the X-direction and the Y-direction, and the relationship between the real position coordinates and the position coordinates according to a center computation is arranged as a correspondence table.

Figure 10:
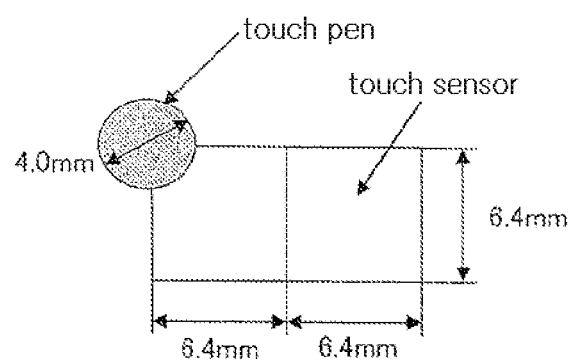
FIG. 10 illustrates a case where a width of a touch area by a touch pen is smaller than a detection width of one touch sensor.

The correspondence table can be simply created by simulations. For example, as shown in FIG. 10, a detection area of the touch sensor is defined as a square area, and a touch area of a touch pen is defined as a circle area. The touch pen moves in order by the same pitch, and sensor outputs are obtained, assuming that the contact area of the touch pen and the touch sensor is proportional to the sensor output. A center coordinate is computed based on the sensor output using Equation (1) discussed above with respect to an entire surface of the touch panel. The touch positions across the entire surface of the touch panel are put as the real position coordinates, and the correspondence table including the real position coordinate and the corresponding center position at each position is created.

The correspondence table can also be created based on accurate measurements. Experimentally, the relative relationship between the touch pen and the touch sensor can be accurately adjusted by providing a real touch panel on an XY stage. The touch pen is touched onto an entire surface of the touch panel in order, and a coordinate of the real touch position is mapped onto Raw data (the sensor output) by the touch sensor at that time and is then read. After removing noises in the sensor output, differential data from the background, and the touch area corresponding to a valid signal portion is detected. A center coordinate of the touch area is calculated at each touch position using Equation (1). The touch positions across an entire surface of the touch panel is used as the real position coordinates, and a correspondence table between the real position coordinate and the center coordinate at each position is created.

The data of the correspondence table, which is created by, for example, one of the above-mentioned methods, can be recorded in a memory. In this case, the addresses of the correspondence table can be XY coordinates of the real touch positions, and the contained data can be the calculated center coordinates.

Figure 2A:
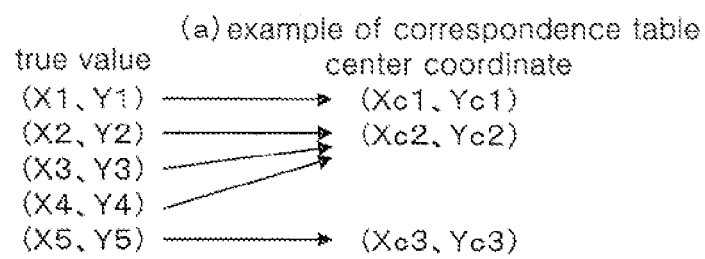

A method of creating an LUT from the correspondence table will now be described. FIGS. 2A and 2B are views for explaining a method of creating a conversion table (e.g., lookup table: LUT) used in a touch panel device according to Embodiment 1 of the present invention. Specifically, FIG. 2A shows a correspondence table which was created in advance, and FIG. 2B shows an LUT which is created based on the correspondence table of FIG. 2A.

Figure 11A:
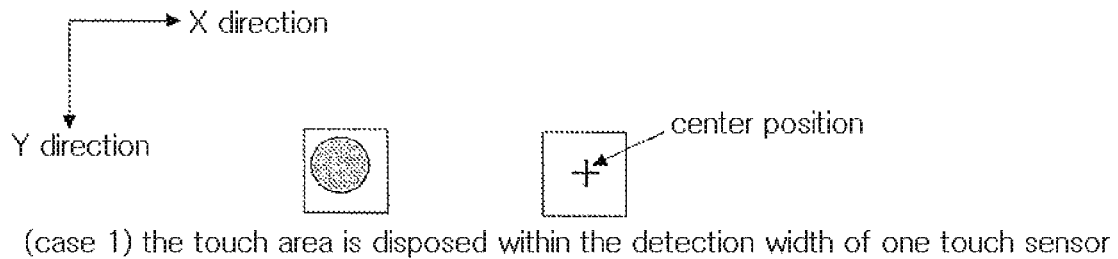
FIGS. 11A to 11C are views for explaining a problem when a touch position detection is performed based on a center position using the touch pen and touch sensor of FIG. 10.
Figure 11B:
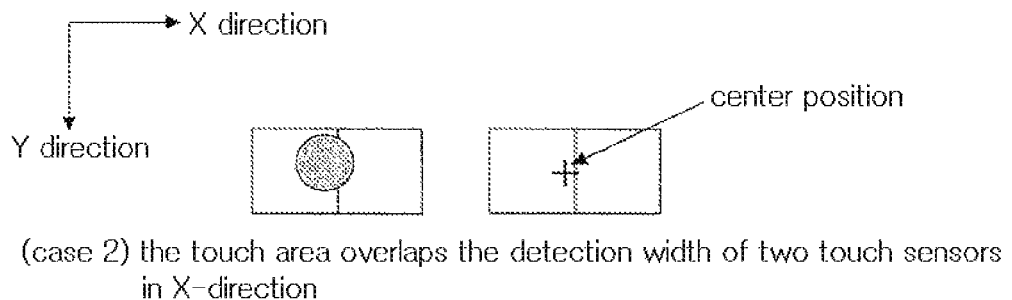
Figure 11C:
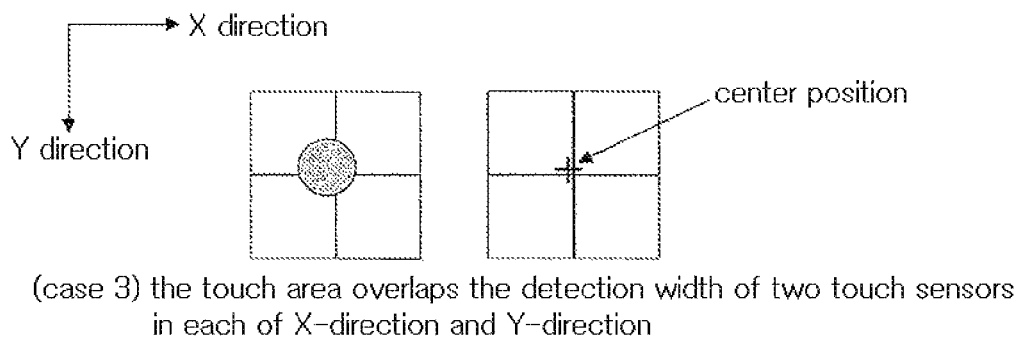

In a case where real position coordinates and calculated center coordinates have a relationship of 1:1, an LUT can be implemented in a memory that outputs a real position coordinate in response to an input of a center coordinate. It is beneficial that there is a one-to-one correspondence relationship between real position coordinates and position coordinates according to the center computation. However, when a width of the touch area is smaller than a detection width of one touch sensor as in the cases described with respect to FIGS. 11A to 11C, a plurality of real position coordinates can, for example, correspond to a single center coordinate if the touch area is moved within a detection range of one touch sensor.

As illustrated in FIG. 2A, two coordinates (Xc1, Yc1) and (Xc3, Yc3) are obtained as the center coordinates in a one-to-one correspondence with the real values (X1, Y1) and (X5, Y5), respectively, and one coordinate (Xc2, Yc2) is obtained as the center coordinate for the three real values (X2, Y2), (X3, Y3) and (X4, Y4). In this case, in order to reduce errors, it is beneficial to create a set of the real position coordinates corresponding to the center coordinate of any one point, to calculate the center position value or the average value of the set, and to implement the value in the LUT.

FIG. 2B illustrates an LUT in which the center coordinates are put as addresses and the coordinates of the touch positions outputted to correspond to the center coordinates have X values and Y values. In the LUT, since the center coordinate (Xc1, Yc1) is in a one-to-one correspondence with the true value, the true value (X1, Y1) is contained as the touch position coordinate. Similarly, the center coordinate (Xc3, Yc3) is also in a one-to-one correspondence with the true value, the true value (X5, Y5) is contained as the touch position coordinate. In the meantime, when the center coordinate is (Xc2, Yc2), since there are a plurality of corresponding true values, an average value of the true values is obtained, and the average value ((X2+X3+X4)/3, (Y2+Y3+Y4)/3) is contained as the touch position coordinate.

By creating and implementing the LUT, the center position coordinate calculated from the sensor output of the touch panel is inputted into the LUT, and the real position coordinate is read from the LUT in real operation, so that the touch coordinate can be calculated with high speed and precision.

The LUT of FIG. 2B is configured to contain a plurality of true values corresponding to one center position. As a result, the values defined as the addresses have the same pitch, and there are some address values that are not defined in the LUT.

In simulation, a place where there is no address value is not accessed. However, in operation of a real device, places where there is no data may be accessed when a result of the center computation is unstable due to, for example, a noise. In such a case, the center coordinate may not be corrected by the LUT, and a process of filling in defect portions of the LUT may be performed. For example, by performing an interpolation process from the neighboring addresses and their corresponding center coordinate values, an appropriate center coordinate can be outputted using the LUT according to results of all the center computations.

In Embodiment 1, when a width of the touch area is smaller than a detection width of one touch sensor, an LUT of correcting center position coordinates is created in advance to improve precision in calculation of touch coordinates. Particularly, when an LUT is created based on accurate measurements using a real touch panel, precision in calculation touch coordinates may be further improved because the LUT already takes into account error factors caused by, for example, non-uniform sensitivity of each touch sensor or irregular arrangements.

Also, by interpolating defect portions of the LUT, malfunction of accessing defect portions due to a noise, etc. can be reduced or prevented, and an appropriate center coordinate can be outputted using the LUT according to results of all the center computation. As a result, it is possible to obtain a touch panel device and a method for calculating the touch position coordinate of the touch panel that can calculate touch coordinates with high speed and precision.

Embodiment 2

In Embodiment 2 of the present invention, when a width of a touch area is smaller than a detection width of one touch sensor and a deviation of the touch area occurs at an edge portion of a touch panel, a method for calculating a touch position coordinate with high precision will now be described.

When a width of a touch area is smaller than a detection width of one touch sensor and there is a deviation of the touch area at an edge portion of the touch panel, a center coordinate is simply obtained from an output of the one touch sensor, and a central position of the touch sensor itself is calculated as the touch position coordinate. Namely, the touch coordinate may not be calculated at an edge side area rather than using the center position of the touch sensor itself in the edge portion of the touch panel. In an edge portion, an output of a neighboring touch sensor may not be obtained, and a magnitude of the output value of a corresponding touch sensor may be lowered as the deviation area increases.

In Embodiment 2 of the present invention, by performing a quantization depending on magnitudes of sensor output values, dividing the sensor output values into a plurality of ranges, and creating an LUT individually in each range, a touch coordinate can be calculated at an edge side area with high precision rather than using a central position of the touch sensor itself That is, in Embodiment 2 of the present invention, the more touch positions are disposed over an edge portion, the lower a level of the sensor output becomes, and mechanism of improving detection precision of touch positions is implemented.

Specifically, an n-bit quantization is performed with respect to sensor output levels, and a plurality of LUTs are prepared to correspond to the quantization values, respectively. Due to cost constraints, infinite types of LUTs may not be prepared, and four types of LUTs can be, for example, prepared, if n=2.

Additionally, in a center portion of the touch panel, when there is no deviation of the touch area and the position extending over one touch sensor and another touch sensor is touched, a drop in an output of one touch sensor is reflected in an output of another touch sensor. As a result, a sum level of the output values of a plurality of touch sensors is maintained within a certain range, and the relationship between the sensor output level and the center position is not shaken. Thus, one LUT is prepared in the center portion of the panel, and a plurality of LUTs are prepared only in the edge portion.

FIG. 3 is a view for explaining a quantization of a sensor output in Embodiment 2 of the present invention. FIG. 4 is a view for explaining a method of correcting a touch coordinate using a plurality of LUTs in Embodiment 2 of the present invention. Herein, a 2-bit quantization is performed and four types of LUTs are created by way of example.

When n=2 and a 2-bit quantization is performed, as illustrated in FIG. 3, maximum and minimum values are set with respect to sensor outputs. In this case, the quantization value can be obtained by the following Equation (2).

$$\left.\begin{array}{l}\text{quantization} \\ \text{value}\end{array} = \frac{(\text{sensor output} - \text{minimum})}{(\text{maximum} - \text{minimum})/(2^n - 1)} \right\} \quad \text{Equation (2)}$$
$$\text{if (quantization value} > (2^n - 1)) \quad \begin{array}{l}\text{then quantization} \\ \text{value} = (2^n - 1)\end{array}$$
$$\text{if (quantization value} < 0) \quad \begin{array}{l}\text{then quantization} \\ \text{value} = 0\end{array}$$

According to equation (2), 2 is obtained as the quantization value corresponding to an output value of x indication in FIG. 4. In addition, as illustrated in FIG. 4, by calculating a center coordinate based on the true value, the sensor output and the quantization value, the correspondence table can be created with respect to each quantization value. Moreover, an LUT defining a correspondence relationship between center coordinates and touch position coordinates can be created with respect to each quantization value.

Figure 5:
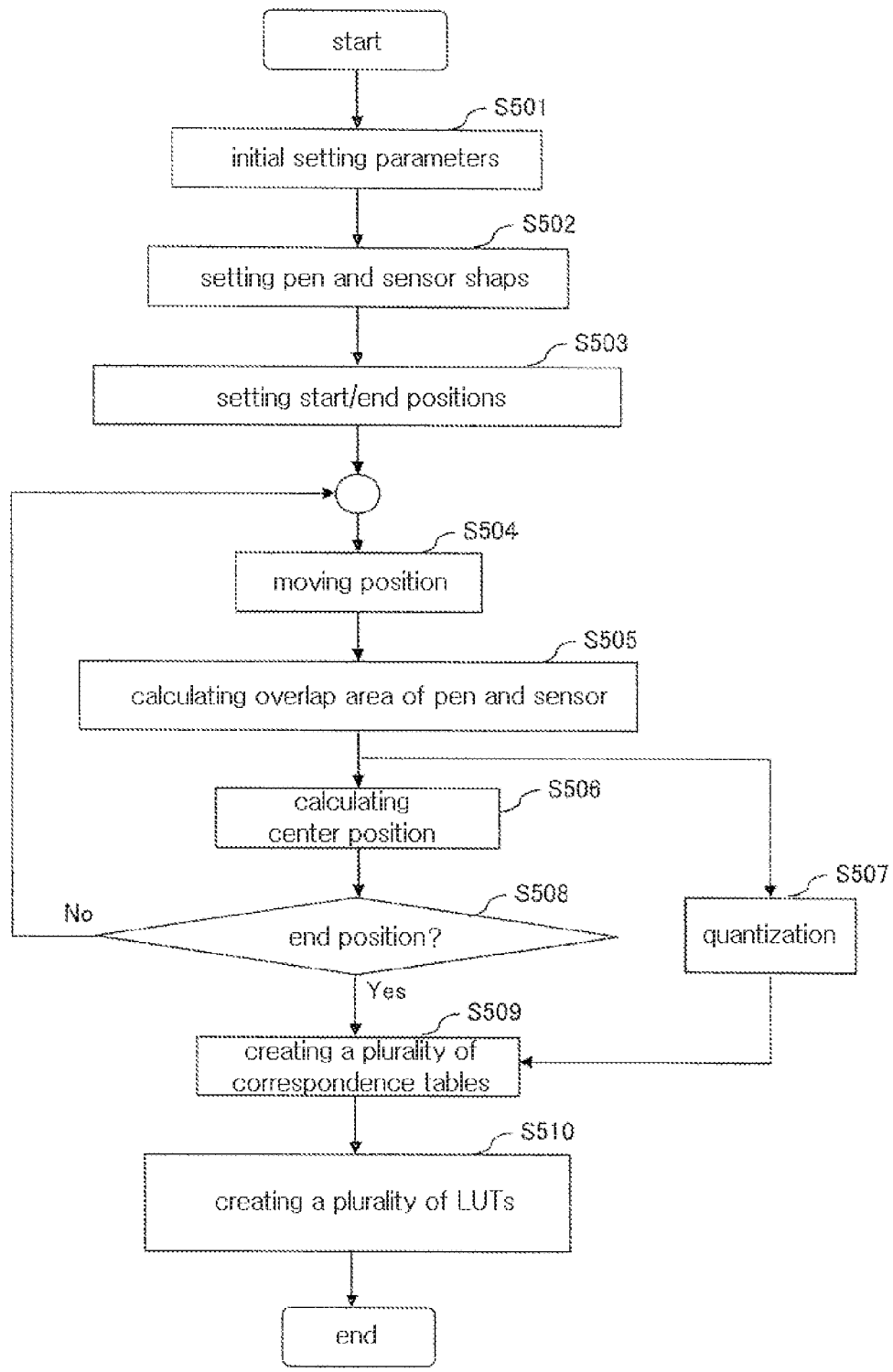
FIG. 5 is a flow chart illustrating a series of processes for creating a plurality of LUTs by a simulation according to an embodiment of the present invention.

FIG. 5 is a flow chart illustrating a series of processes for creating a plurality of LUTs by a simulation according to Embodiment 2 of the present invention.

First, various parameters for the simulation such as a touch pen, a shape of a touch sensor, a physical size, a scan method, a display method, a file output, and so on are set up (step S501 and step S502). Moreover, a start scan position and an end scan position of the pen are determined (step S503).

Next, a position of the touch pen is moved by an increment of XDIV and YDIV (step S504). Then, an overlap area between the touch pen and the touch sensor is computed, and an output value of the touch sensor proportional to the overlap area is calculated (step S505). A center position is calculated from the output value of the sensor around the touch pen (step S506). In addition, the sensor output is quantized into an n-bit, running parallel with step S506 (step S507).

It is decided whether the pen reaches the end scan position or not, and if not, it goes back to step S504, thereby repeating the loop (step S508). Meanwhile, after ending the scan, a plurality of correspondence tables about the center coordinates are created from the quantization values and the real positions (step S509). Furthermore, a plurality of LUTs are created from the plurality of correspondence tables (step S510).

Figure 6:
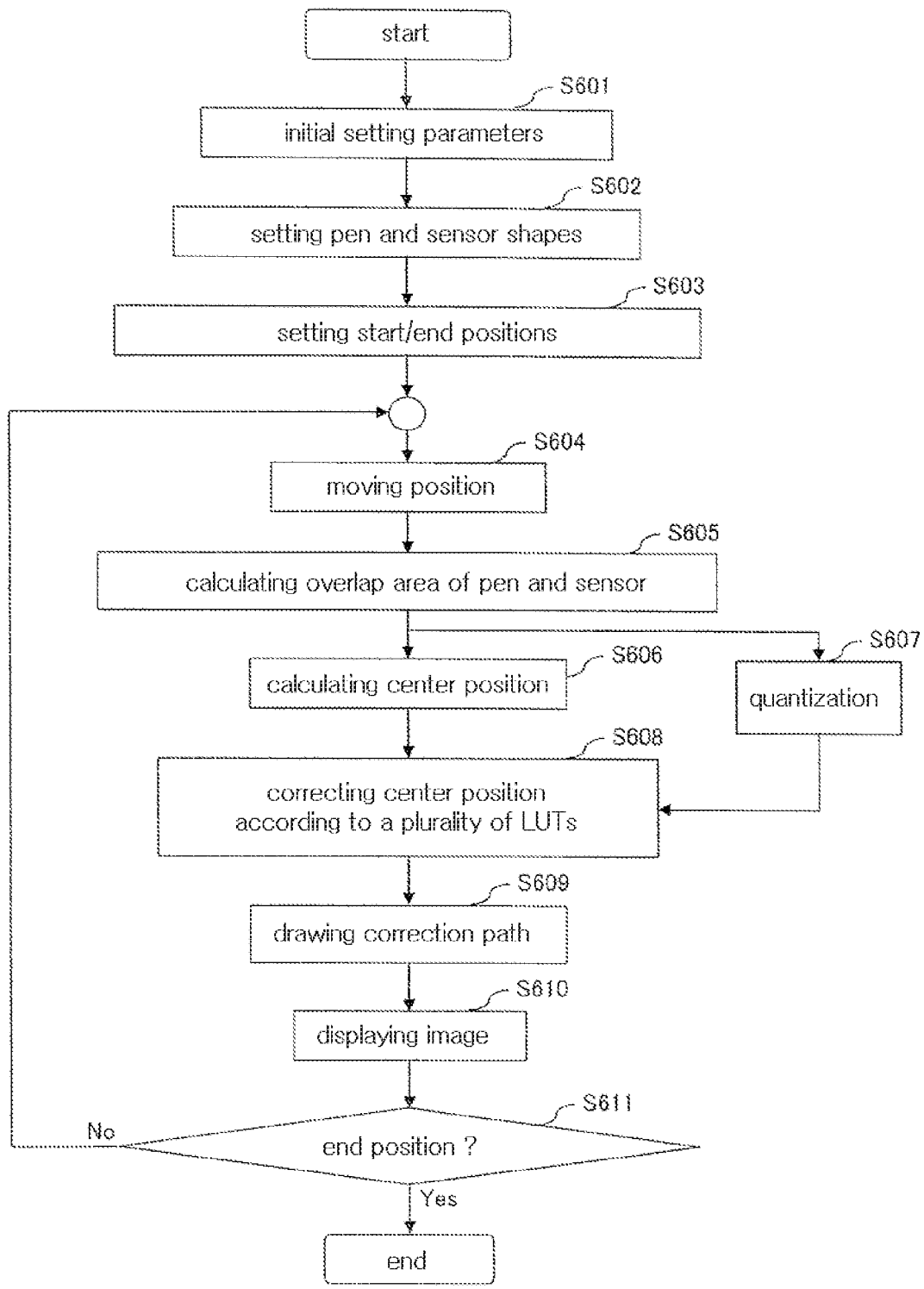
FIG. 6 is a flow chart illustrating a series of processes for correcting a touch coordinate using a plurality of LUTs according to an embodiment of the present invention.
Figure 7:
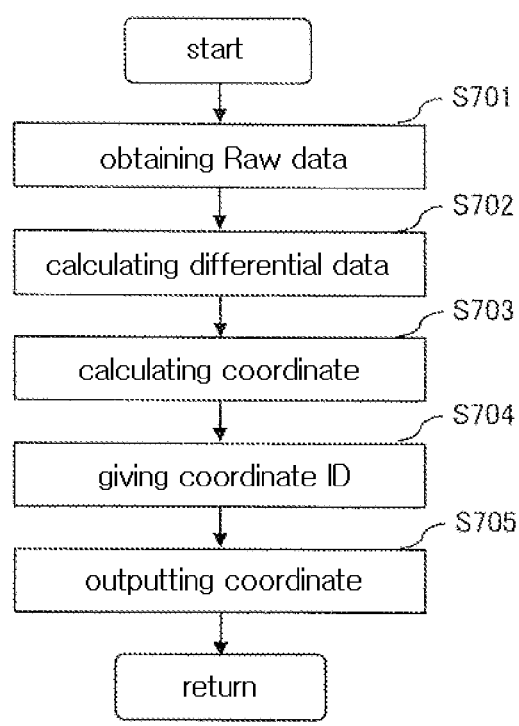
FIG. 7 is a flow chart for explaining a method for calculating a touch position coordinate in a touch panel device according to the related art.

A detail explanation will be made for orders to obtain an output value of a touch coordinate using a plurality of LUTs with a flow chart. FIG. 6 is a flow chart illustrating a series of processes for correcting a touch coordinate using a plurality of LUTs in Embodiment 2 of the present invention.

First, various parameters of a simulation such as a touch pen, a shape of a touch sensor, a physical size, a scan method, a display method, a file output, and so on are set up (step S601 and step S602). Moreover, a start scan position and an end scan position of the pen are determined (step S503).

Next, a position of the touch pen is moved by an increment of XDIV and YDIV (step S604). Then, an overlap area between the touch pen and the touch sensor is computed, and an output value of the touch sensor proportional to the overlap area is calculated (step S605). A center position is calculated from the output value of the touch sensor around the touch pen (step S606). In addition, the sensor output is quantized into an n-bit, running parallel with the step S606 (step S607).

The center position is corrected using the plurality of LUTs obtained in advance (step S608). Next, the corrected center position is marked by a cross, and a moving path of the corrected center position is drawn as a line (step S609). An image is displayed (step S610). Lastly, it is decided whether the pen reaches the end scan position or not, and if not, it goes back to step S604, thereby repeating the loop (step S611). In the meantime, after ending the scan, the series of processes are ended.

In Embodiment 2, a touch coordinate is calculated using a plurality of LUTs according to an output value of a touch sensor in an edge portion of a touch panel. As a result, when a width of the touch area is smaller than a detection width of one touch sensor and there is a deviation of the touch area at an edge portion of the touch panel, the touch position coordinate can be calculated with high precision.

Particularly, when the touch position coordinate is calculated, the LUT created in advance is referred to, and it is possible to significantly increase precision of the touch coordinate calculation and to be capable of calculating the touch coordinate at high speed, thereby providing the touch panel with excellent operability.

By creating an LUT for correcting a center position coordinate in advance and applying the LUT, precision of the touch coordinate calculation can be improved by, for example, taking into account error factors that may be generated by non-uniform sensitivity of each touch sensor or irregular arrangements. As a result, when a width of the touch area is smaller than a detection width of one touch sensor, a touch coordinate can be calculated with high speed and precision, thereby obtaining a touch panel device and a method for calculating a touch position coordinate of a touch panel with improved operability.

It will be apparent to those skilled in the art that various modifications and variation can be made in the present invention without departing from the concepts and scope of the invention. Thus, it is intended that the present invention cover the modifications and variations of this invention provided they come within the scope of the appended claims and their equivalents.

What is claimed is:

1. A touch panel device including a plurality of touch sensors, each touch sensor outputting a raw analog signal for detecting a touch position, comprising:

a coordinate calculation circuit that calculates a touch coordinate froman output value of at least one of the plurality of touch sensors; and a coordinate correction circuit that receives a calculated touch coordinate from the coordinate calculation circuit, includes a lookup table that stores a correspondence relationship between a plurality of real touch position coordinates and a plurality of calculated touch coordinates, and extracts one of the plurality of real touch position coordinates as a corrected touch coordinate that corresponds to the calculated touch coordinate, wherein at least one of the plurality of real touch position coordinates represents an average value of two or more true values that are different from real touch position coordinates of the plurality of real touch position coordinates that are immediately adjacent to the least one of the plurality of real touch position coordinates in the lookup table, and wherein each of the two or more true values is determined when a width of a touch area, which is a contact area of a touch pen and the at least one of the plurality of touch sensors, is smaller than a detection width of the at least one of the plurality of touch sensors, wherein the plurality of touch sensors are arranged in a first direction and extend in a second direction, each of the plurality of touch sensors has a first length along the first direction and a second length along the second direction equal to the first length, and the detection width is the first length, wherein the lookup table includes XY coordinates of the plurality of calculated touch coordinates as addresses and X values and Y values of the plurality of real touch position coordinates as data, wherein the lookup table is created using a correspondence table in which a corresponding relationship between a plurality of true values including the two or more true values and the plurality of calculated touch coordinates is recorded, wherein the correspondence table includes XY coordinates of the plurality of true values as addresses and the XY coordinates of the plurality of calculated touch coordinates as data, wherein a number of the plurality of true values is more than a number of the plurality of calculated touch coordinates, wherein the plurality of calculated touch coordinates are calculated u sing Xcenter=Xsum/Dsum and Ycenter=Ysum/Dsum, wherein Dsum=$\Sigma_{i=1}^{n}$Di, Xsum=$\Sigma_{i=1}^{n}$Di×Xi, and Ysum=$\Sigma_{i=1}^{n}$Di×Yi, wherein Di is an out putvalue of each touch sensor, Xi is an X coordinate of a center of each touch sensor, and Yi is an Y coordinate of a center of each touch sensor, and wherein n is an integer.

2. The touch panel device according to claim 1, wherein the correspondence relationship is prepared with respect to a substantially entire surface of a touch panel when the touch panel is touched.

3. The touch panel device according to claim 2, wherein the correspondence relationship is prepared by setting a center position of two or more real touch positions and a repeated touch coordinate as one-to-one conversion data when the repeated touch coordinate is calculated with respect to the two or more real touch positions.

4. The touch panel device according to claim 3, wherein the correspondence relationship is prepared by setting one real touch position and one touch coordinate as one-to-one conversion data when the one touch coordinate which does not overlap a touch coordinate of another touch position is calculated with respect to the one real touch position.

5. The touch panel device according to claim 1, wherein the output value of the touch sensor in an edge portion of the touch panel is quantized into two or more bits and a plurality of quantization values are calculated, wherein the coordinate correction circuit further includes a plurality of lookup tables corresponding to the plurality of quantization values with respect to the edge portion, and wherein the coordinate correction circuit extracts a touch position corresponding to the touch coordinate calculated by the coordinate calculation circuit from the plurality of lookup tables corresponding to the quantization values and stored in a memory unit using the plurality of quantization values and to output the touch position as the corrected touch coordinate.

6. The touch panel device according to claim 5, wherein a maximum value and a minimum value are set considering the output value of the touch sensor and quantization is performed by subdividing values between the maximum value and the minimum value.

7. The touch panel device according to claim 1, wherein when the real touch position coordinate corresponding to the touch coordinate calculated by the coordinate calculation circuit that is stored in the lookup table does not provide data due to a defect, the coordinate correction circuit extracts an interpolated touch position coordinate obtained by an interpolation process of immediately neighboring real touch position coordinates of the real touch position coordinate that does not provide data from the lookup table due to the defect and outputs the interpolated touch position coordinate instead of the data not provided from the lookup table due to the defect, wherein the touch panel device includes a first lookup table corresponding to a center portion of the touch panel device and a second lookup table corresponding to an edge portion of the touch panel device, and wherein a number of the first lookup table is different from a number of the second lookup table.

* * * * *